United States Patent
Benedict et al.

(10) Patent No.: US 11,701,822 B2
(45) Date of Patent: Jul. 18, 2023

(54) INKJET BASED SOLID PARTICLE POWDER BED CROSSLINKING

(71) Applicant: PALO ALTO RESEARCH CENTER INCORPORATED, Palo Alto, CA (US)

(72) Inventors: Michael Benedict, Palo Alto, CA (US); Junhua Wei, Palo Alto, CA (US); Gabriel Iftime, Newark, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 17/322,534

(22) Filed: May 17, 2021

(65) Prior Publication Data
US 2022/0362990 A1 Nov. 17, 2022

(51) Int. Cl.
*B29C 64/165* (2017.01)
*B33Y 30/00* (2015.01)
(Continued)

(52) U.S. Cl.
CPC .......... *B29C 64/165* (2017.08); *B33Y 10/00* (2014.12); *B33Y 30/00* (2014.12); *B29C 64/295* (2017.08)

(58) Field of Classification Search
CPC ..... B29C 64/165; B29C 64/295; B33Y 10/00; B33Y 30/00
See application file for complete search history.

(56) References Cited

U.S. PATENT DOCUMENTS

| | | |
|---|---|---|
| 5,855,836 A | 1/1999 | Leyden et al. |
| 7,601,421 B2 | 10/2009 | Khabashesku et al. |

(Continued)

FOREIGN PATENT DOCUMENTS

| | | |
|---|---|---|
| CN | 104693897 A | 6/2015 |
| WO | 2003059993 | 7/2003 |

(Continued)

OTHER PUBLICATIONS

Sudeep, et al., "Covalently interconnected three-dimensional graphene oxide solids," ACS Nano, American Chemical Society USA, vol. 7, No. 8, Aug. 27, 2013, pp. 7034-7040.

(Continued)

*Primary Examiner* — Joseph S Del Sole
*Assistant Examiner* — John Robitaille
(74) *Attorney, Agent, or Firm* — Miller Nash LLP

(57) ABSTRACT

A method of three-dimensional manufacturing including depositing a layer of powder in a powder bed, the layer comprising particles of at least a first component of a two-component reactive material, dispensing a first solution containing at least one of a solvent and a second component of the two-component reactive material the solvent selected to cause the two components to form one or more cross-linked regions of a three-dimensional object, iterating the depositing and dispensing to form subsequent layers of the three-dimensional object until the object is formed, and removing any unwanted particles from the object. A three-dimensional manufacturing system has a powder bed to hold layers of particles, and one or more print heads positioned to dispense liquid onto the powder bed to cause the particles for form one or more cross-linked regions in layers of a solid object.

17 Claims, 4 Drawing Sheets

(51) Int. Cl.
*B33Y 10/00* (2015.01)
*B29C 64/295* (2017.01)

(56) References Cited

U.S. PATENT DOCUMENTS

| | | | |
|---|---|---|---|
| 7,767,132 | B2 | 8/2010 | Patel et al. |
| 9,193,816 | B2 | 11/2015 | Jiang et al. |
| 9,718,914 | B2 | 8/2017 | Iftime et al. |
| 10,138,317 | B2 | 11/2018 | Iftime et al. |
| 10,906,238 | B1 | 2/2021 | Agarwal et al. |
| 11,385,541 | B2 | 7/2022 | Barrios et al. |
| 11,499,033 | B2 | 11/2022 | Alamri et al. |
| 2006/0217482 | A1 | 9/2006 | Lukehart |
| 2008/0157436 | A1* | 7/2008 | Patel .............. B29C 64/165 |
| | | | 264/401 |
| 2011/0017955 | A1 | 1/2011 | Zhamu et al. |
| 2012/0065299 | A1 | 3/2012 | Lukehart et al. |
| 2014/0275323 | A1 | 9/2014 | Thibodeau et al. |
| 2015/0086881 | A1 | 3/2015 | Zhamu |
| 2016/0193751 | A1 | 7/2016 | Humfeld |
| 2017/0058070 | A1 | 3/2017 | Iftime et al. |
| 2019/0194417 | A1 | 6/2019 | Wei et al. |
| 2020/0198975 | A1 | 6/2020 | Beh et al. |
| 2022/0220267 | A1 | 7/2022 | Wei et al. |

FOREIGN PATENT DOCUMENTS

| | | | |
|---|---|---|---|
| WO | 2015/184223 | | 12/2015 |
| WO | 2016209630 | | 12/2016 |
| WO | 2018080045 | | 5/2018 |
| WO | WO-2020237161 A1 * | 11/2020 | .............. B22F 10/10 |

OTHER PUBLICATIONS

Chronopoulos et al., "High-Yield Alkylation and Arylation of Graphene via Grignard Reaction with Fluorographene," Chemistry of Materials, vol. 29, No. 3, Feb. 14, 2017, pp. 926-930.
Ye, Xiangyuan et al., "Covalent Functionalization of Fluorinated Graphene and Subsequent Application as Water-based Lubricant Additive," ACS Applied Materials and Interfaces, vol. 8, No. 11, Mar. 23, 2016, Mar. 23, 2016.
Feng, Wei et al., "Two-Dimensional Fluorinated Graphene: Synthesis, Structures, Properties and Applications" Advanced Science, vol. 3 (2016), 22 pp.
Chronopoulos, Demetrios D. et al., "Chemistry, properties, and applications of fluorographene," Applied Materials Today, vol. 9 (2017) pp. 60-70.
Novoselov, K.S., et al. "A roadmap for graphene," Nature, vol. 490 (Oct. 11, 2012), pp. 192-200.
Layek, Rama K. et al. "A review on synthesis and properties of polymer functionalized graphene," Polymer, vol. 54 (2013), pp. 5087-5103.
Young, Robert J. "The mechanics of graphene nanocomposites: a review," Composites Science and Technology, vol. 72 (2012), pp. 1459-1476.
Marcano, Daniela C. et al. "Improved Synthesis of Graphene Oxide," ACS Nano, vol. 4, No. 8, (Jul. 22, 2010), pp. 1806-4814.
Ling, Xi et al. "Lighting up the Raman Signal of Molecules in the Vicinity of Graphene Related Materials," American Chemical Society, vol. 48 (2015), pp. 1862-1870.
Luo, Yuancong et al. "Fabrication of a three-dimensional reinforcement via grafting epoxy functionalized graphene oxide into carbon fibers," Materials Letters 209 (2017), pp. 463-466.
Bao, Chenlu et al. "In situ preparation of functionalized graphene oxide/epoxy nanocomposites with effective reinforcements" J. Materials Chemistry 21 (2011), pp. 13290-132098.
Lu, Shaorong et al. "Epoxy nanocomposites filled with thermotropic liquid crystalline epoxy grafted graphene oxide" RCS Advances 3 (2013) pp. 8915-8923.
Kowalczyk K. and Spychaj, T. "Ionic Liquids as Convenient Latent Hardeners of Epoxy Resigns" Polimery, 48:11-12, (Jan. 1, 2003) pp. 833-835.
Li et al. "Synthesis and characterization of reinforced acrylate photosenstive resin by 2-hydroxyethyl methacrylate-functionalized graphene nanosheets for 3D printing" J. Materials Science (2018) 53, pp. 1874-1886.
Xia et al. "Functionalied graphene serving as free radical scavenger and corrosion protection in gamma-irradiated epoxy composites" Carbon 101 (2016), pp. 315-323.
Wan et al. "Grafting of expoxy chains onto graphene oxide for epoxy composites with improved mechanical and thermal properties," Carbon 69 (2014), pp. 467-480.
Li et al. "Control of the functionality of graphene oxide for its application in epoxy nanocomposites" Polymer 54 (2013) pp. 6437-6446.
Rafiee, M.A. et al. "Enhanced Mechanical Properties of Nanocomposites at Low Graphene Content", ASC NANO, 2009, pp. 3884-3890.
U.S. Appl. No. 17/157,637, filed Jan. 25, 2021.

* cited by examiner

INKJET BASED SOLID PARTICLE POWDER BED CROSSLINKING

TECHNICAL FIELD

This disclosure relates to three-dimensional manufacturing, more particularly to three-dimensional manufacturing using powder beds.

BACKGROUND

Three-dimensional manufacturing techniques include many different types of manufacturing including 3D printing, selective laser sintering (SLS), etc. Palo Alto Research Center (PARC) has developed a body of work around linked particle networks. These networks typically comprise polymers with functionalized particles directly linked into a linked particle network. This may involve highly loaded particles, such as those that have high contents of graphene. Liquid inks do not generally work well with higher amounts of material, making the use of liquid inks prohibitive. Using solid particles may alleviate that issue. There are advantages to an approach that could combine the flexibility of printing with solid or highly loaded particles.

SUMMARY

According to aspects illustrated here, there is provided a method of three-dimensional manufacturing that includes depositing a layer of powder in a powder bed, the layer comprising particles of at least a first component of a two-component reactive material, dispensing a first solution containing at least one of a solvent and a second component of the two-component reactive material the solvent selected to cause the two components to form one or more cross-linked regions of a three-dimensional object, iterating the depositing and dispensing to form subsequent layers of the three-dimensional object until the object is formed, and removing any unwanted particles from the object.

According to aspects illustrated here, there is provided a three-dimensional manufacturing system that has a powder bed to hold layers of particles, and one or more print heads positioned to dispense liquid onto the powder bed to cause the particles for form one or more cross-linked regions in layers of a solid object.

DETAILED DESCRIPTION OF THE EMBODIMENTS

Figure 1:
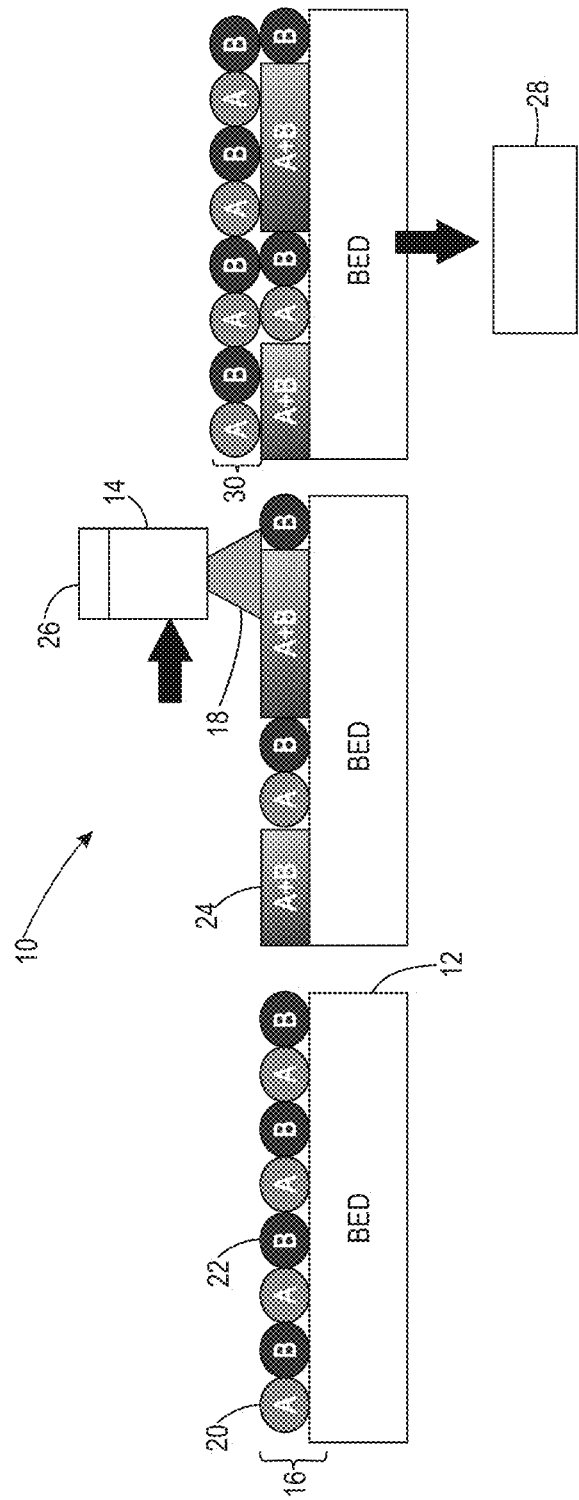
FIG. 1 shows an embodiment of a three-dimensional manufacturing system.
Figure 2:
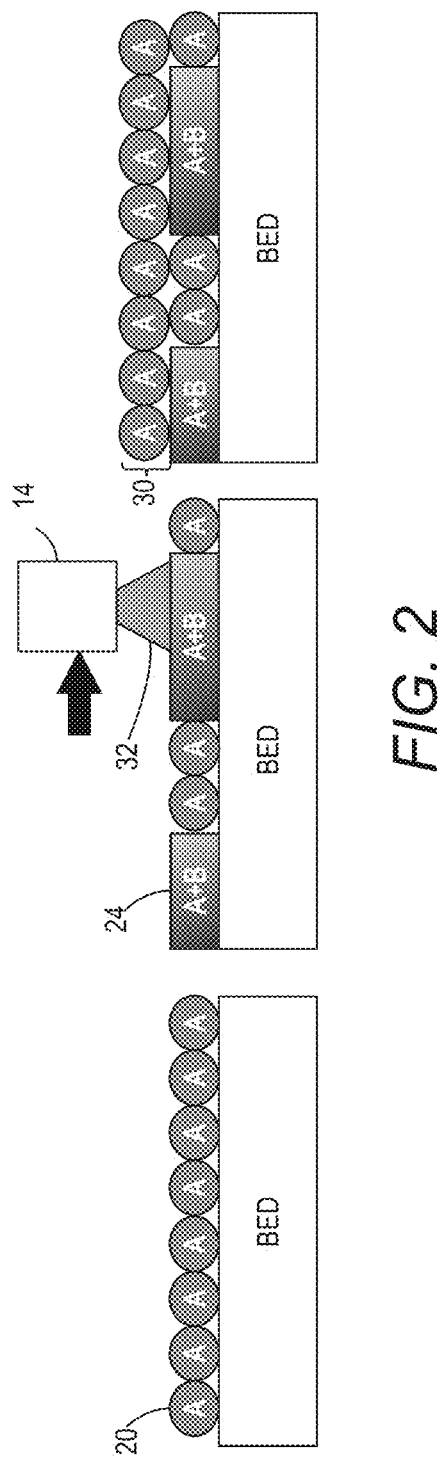
FIG. 2 shows an alternative embodiment of a three-dimensional manufacturing system.
Figure 3:
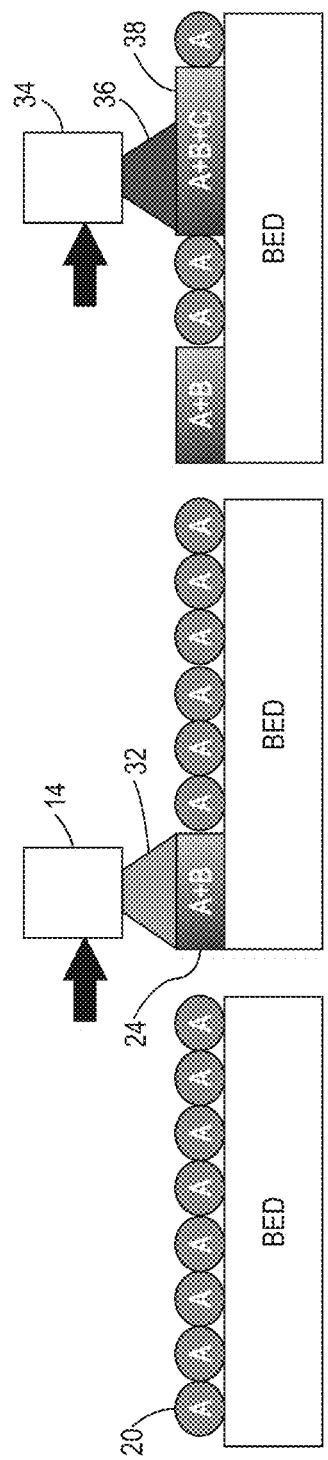
FIG. 3 shows an alternative embodiment of a three-dimensional manufacturing system.

FIGS. 1-3 show embodiments of three-dimensional manufacturing systems. One should note that some components shown in one embodiment may also occur in the other embodiments but are not show here for ease of discussion. Further, FIGS. 1 and 2 show alternative embodiments of the materials used, but any other components in the system may be used with either of these embodiments as well as any other embodiments disclosed.

The embodiments here involve particles of a two-component reactive material, where the two components upon reacting to each other form a cross-linked region that may also include a chemically linked particle network. The particles of the two components may further comprise "functionalized" materials, meaning that the particles may have functionalized microparticles that can provide particular functions. As will be discussed in more detail further, the two different components may reside in one physical particle, just in solid, or unreacted, form.

Generally, each particle may include at least one type of functionalized microparticles contained at least partially in the one or more matrix material, where the matrix material is a continuous phase material in particle form. The term "particle" as used here may also be referred to as a macroparticle, with the functionalized groups being referred to as microparticles, which are at least partially contained within the matrix material of the macroparticle. As used here, "at least partially contained" means that the functionalized microparticles reside within the matrix material or some portion of the functionalized microparticles resides within the matrix material. More specific information about the particles may be found in U.S. patent application Ser. No. 17/157,637, filed Jan. 25, 2021, which is incorporated herein in its entirety.

For purposes of the discussion here, the particles will consist of a first or a second component of a two-component reactive material, with no order or other particularity being implied by the use of the words "first" and "second." The term "material" refers to the two-component reactive material. The two different components will be referred to as components, not materials. The components may also be referred to as "part A" and "part B" components. The particles may or may not include functionalized microparticles. The two-component material is "reactive" in that when the two components react to each other, they form a cross-linked material. The reaction may start by exposure to some sort of reactive component, such as a solvent, or just by the materials coming in contact with each other, such as two-part, room temperature epoxies.

The components may comprise many different substances including amines, epoxies, and solid monomers in combination or not with an initiator. If one of the components comprises an amine, for example, and has functionalized microparticles, the functionalized microparticles may comprise amines, such as amine functionalized graphene. The particles could also be clay, silica, or titania, as examples. Similarly, if one of the components comprises an epoxy and has functionalized microparticles, the functional microparticles, may comprise an epoxy functionalized graphene.

Examples of the components may include an amine with functionalized microparticles having amine groups, an epoxy with functionalized microparticles having epoxy groups, an amine with functionalized microparticles having graphene groups, and an epoxy with functionalized particles having graphene groups, as well as epoxies and amines without functionalized microparticles, and particles of clay, silica, titania as mentioned above. Further examples may include a first component of an amine with amine-reacted fluorographene (ARFG) functionalized microparticles and a component material of an epoxy, or an epoxy with epoxy reacted fluorographene (ERFG) functionalized particles.

In some embodiments, the two-component reactive material may comprises two solids that occur in combination. These may include a solid amine and a solid epoxy, solid silicone part A and part B, solid nylon part A and part B, and thermoplastic polyurethane part A and part B.

In some embodiments, the particles may include a particle fillers. Particle fillers may take many forms, including clay, graphene, and fume silica. These materials may also be used as functionalized microparticles as mentioned above.

One or the other of the different component particles may comprise an initiator that starts the cross linking reaction. The initiator may comprise a thermal initiator, thermal radical initiator, thermal cationic initiator, photo radical initiator, and photo anionic initiator.

In FIG. 1, the system 10 has a powder bed 12, upon which is initially deposited a first layer 16 of particles 20 of a first component A, and particles 22 of second component B of a two-component system. Typically in powder bed manufacturing systems, such as selective layer sintering (SLS) systems, an object to be manufactured is dissected into layers virtually, and each layer is formed in individual layers of the powder. In an SLS system, there is typically one type of sinterable powder used and the laser forms the object layer by layer.

In the system of FIG. 1, an inkjet or other print head dispenses a liquid or solution 18 onto the layer of mixed components as it moves across the powder bed in the direction of the arrow shown. In this embodiment, the solution may contain at least a solvent selected to cause the particles 20 and 22 to at least partially dissolve and react to each other and form one or more cross-linked regions, which may consist of a linked particle network. By using the inkjet or print head to dispense the solution, the system can precisely "print" the current layer of the object being manufactured.

One should note that the term "ink jet" as used here applies to any type of print head that can dispense solution in response to signals from a controller, not shown. In one embodiment, the ink jet 14 may have a heater 26 attached as shown, or remote from it, that heats the solution. However, heating, either the solution or the final object after formation, is optional.

Once the ink jet has dispensed the solution 18 onto the layer 16, selective regions of the layer will form cross-linked regions, such as 24. The system then deposits the next layer of powder such as 30 of the first and second components and the system performs multiple iterations of the depositing of the powder and dispensing of the solution until formation of the three-dimensional object being manufactured. The finished object may need to have unwanted particles removed from it, such as by agitation, rinsing, blow off with air, etc.

As mentioned above, the object may undergo an optional finishing cure in a heating chamber 28. In one embodiment, the solution would act more as a binder to temporarily hold the materials together and then be activated by the cure in the heating chamber. In this instance, there may be no unwanted particles as none of the particles have undergone curing. The final object may require other types of finishing, such as polishing, shaping, etc.

FIGS. 2 and 3 show other embodiments. To simplify the drawings, these figures do not show the print head heater 26 and the finishing heating chamber 28, and some of the reference numbers have not been repeated, but the same labels would apply the same components in each figure. FIG. 2 shows an embodiment in which the solution contains at least one of the solvent and the second component of the two-component reactive material.

The first component powder particles 20 resides in a layer on the powder bed. The print head 14 dispenses a solution 32 that contains at least the second component of the two-component reactive material. The solution may contain the second component without any solvent, except for any liquid necessary to make the second component liquid, although the material may already exist in liquid form. The solution may contain other materials, such as an initiator, in any of the embodiments. Upon receiving the solution, those regions of the first layer of powder of the first component reacts with the solvent and the second component, or just the second component, to form cross-linked regions such as 24 in the layer.

In any of the embodiments discussed above, a second print head may deposit a second solution onto the cross-linked layer. In one embodiment, the system could dispense the solvent and the second component in separate print heads, such as ink jets do when using different colors in a cyan-yellow-magenta-black (CMYK) color printing system. Having a second print head allows for further adaptation of the manufacturing process. More than just a second solution may also be dispensed. This process may repeat for other solutions that react with different materials.

For example, as shown in FIG. 3, a second or third solution, if the solvent and second component are deposited separately, could provide a strengthening material, such as a binder or material with other characteristics. This allows, for example, the ability to manufacture objects with stress gradients, where portions of the object have different mechanical strength than other portions. The embodiments may allow other types of gradients to form, including electrical and thermal.

While FIG. 3 shows the embodiment shown in FIG. 2 of the solution being at least the second component, the embodiments of FIG. 3 may also apply in a system such as in FIG. 1. In FIG. 3, the print head 14 makes a first pass over either the single component layer with the second component solution 32, as shown, or the two component layer with the solution as previously discussed. This forms the cross-linked regions such as 24 in the current layer. A second print head 34 then makes a second pass and dispenses a solution 36 that adds a third component to selected ones of the cross-linked regions to form a modified cross-linked region 38. As discussed above, this may allow formation of gradients in the final object.

Figure 4:
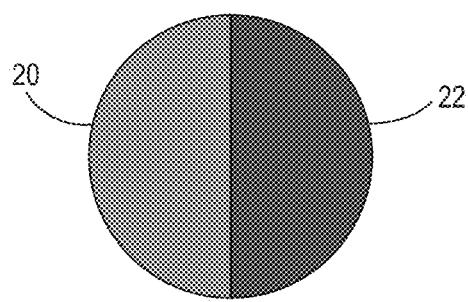
FIG. 4 shows an embodiment of a two-part particle.

Other variations and modifications may exist. For example, as mentioned above and shown in FIG. 4, the powder particles may comprise both the first and second components of the powder in one particle. Other mixtures of materials within particles of either component may also exist, such as initiators, particle fillers, etc. When the solvent contacts these two-part particles, the two parts fuse together and form the cross-linked regions. This embodiment may also benefit from a post-solvent heat cure.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of three-dimensional manufacturing comprising:
   depositing a layer of powder in a powder bed, the layer comprising particles of at least a first component and a second component of a two-component reactive material;
   dispensing a first solution containing a solvent selected to cause the two components to form one or more cross-linked regions of a three-dimensional object;
   iterating the depositing and dispensing to form subsequent layers of the three-dimensional object until the object is formed; and
   removing any unwanted particles from the object.

2. The method as claimed in claim 1, wherein depositing the layer of powder comprises depositing particles of the first component and particles of the second component of the two-component reactive material and the solution contains the solvent.

3. The method as claimed in claim 1, wherein depositing the layer of powder comprises depositing particles that have both the first component and second component in each particle.

4. The method as claimed in claim 1, wherein dispensing the solution comprises dispensing a solution that contains an initiator.

5. The method as claimed in claim 1, further comprising heating the solution prior to dispensing.

6. The method as claimed in claim 1, further comprising heating the three-dimensional object after completion.

7. The method as claimed in claim 1, wherein the first component comprises amine and the second component comprises epoxy.

8. The method as claimed in claim 1, wherein the first component comprises epoxy and the second component comprises amine.

9. The method as claimed in claim 1, wherein the two component reactive material is one of: amine and epoxy, silicone part A and part B, nylon part A and part B, and thermoplastic polyurethane part A and part B.

10. The method as claimed in claim 1, wherein the particles have functionalized microparticles.

11. The method as claimed in claim 10, wherein the particles comprise solid epoxy and the microparticles comprise functionalized epoxy-reacted fluorographene.

12. The method as claimed in claim 10, wherein the particles comprise solid amine and the microparticles comprise functionalized amine-reacted fluorographene.

13. The method as claimed in claim 10, wherein the functionalized particles is selected from a group consisting of graphene, carbon particles, carbon nanotube, clay, alumina, silica, titania, silicon carbide, boron nitride.

14. The method as claimed in claim 1, further comprising dispensing at least a second solution containing at least a third component after dispensing the first solution.

15. The method as claimed in claim 14, wherein dispensing the at least a second solution comprises dispensing the second solution onto only selected regions of the one or more cross-linked regions.

16. A method of three-dimensional manufacturing comprising:
   depositing a layer of powder in a powder bed, the layer comprising particles of at least a first component of a two-component reactive material, the particles having functionalized microparticles and the particles and microparticles comprise one of either solid epoxy particles and microparticles of functionalized epoxy-reacted fluorographene, or solid amine particles and microparticles of functionalized amine-reacted fluorographene;
   dispensing a first solution containing a solvent and a second component of the two-component reactive material the solvent selected to cause the two components to form one or more cross-linked regions of a three-dimensional object;
   iterating the depositing and dispensing to form subsequent layers of the three-dimensional object until the object is formed; and
   removing any unwanted particles from the object.

17. A method of three-dimensional manufacturing comprising:
   depositing a layer of powder in a powder bed, the layer comprising particles of a first component of a two-component reactive material, the particles having functionalized microparticles and the particles are selected from a group consisting of graphene, carbon particles, clay, alumina, silica, titania, silicon carbide, and boron nitride;
   dispensing a first solution containing a solvent and a second component of the two-component reactive material the solvent selected to cause the two components to form one or more cross-linked regions of a three-dimensional object;
   iterating the depositing and dispensing to form subsequent layers of the three-dimensional object until the object is formed; and
   removing any unwanted particles from the object.

* * * * *